T. BAKER.
PROCESS OF RECOVERING SOLVENTS.
APPLICATION FILED MAR. 26, 1915.
1,218,616.
Patented Mar. 13, 1917.
2 SHEETS—SHEET 1.
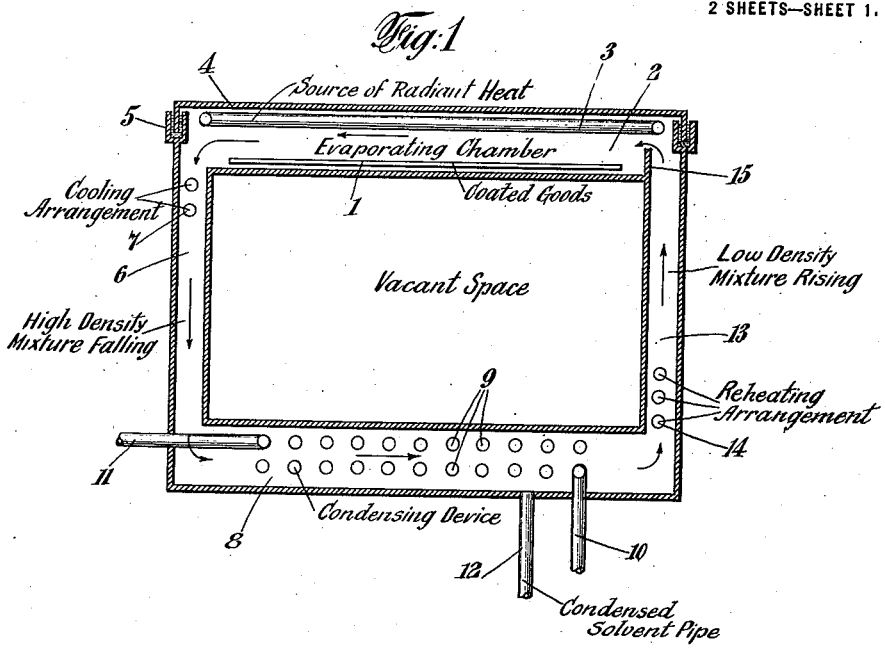
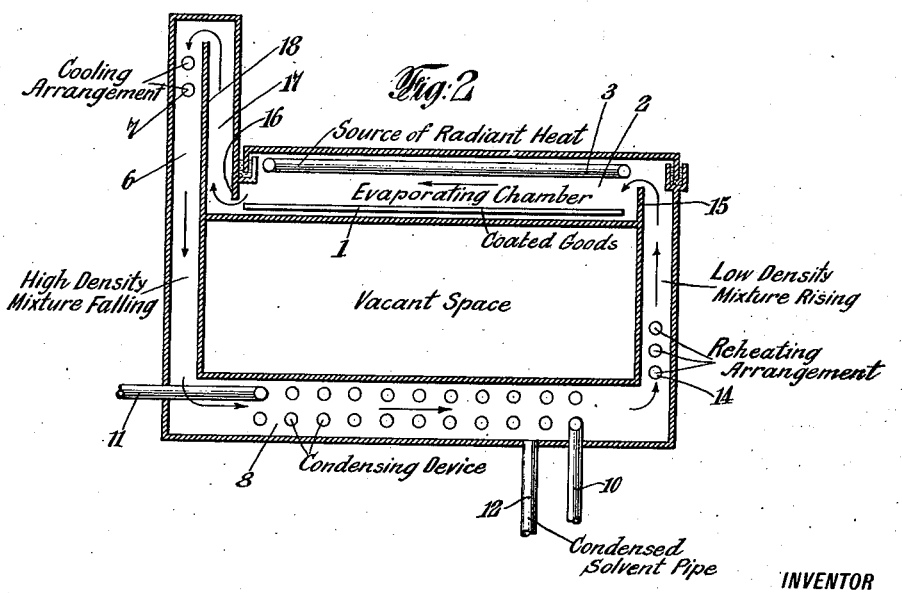
INVENTOR
Theodore Baker
BY
Pringle, Winfrey & Small
ATTORNEYS

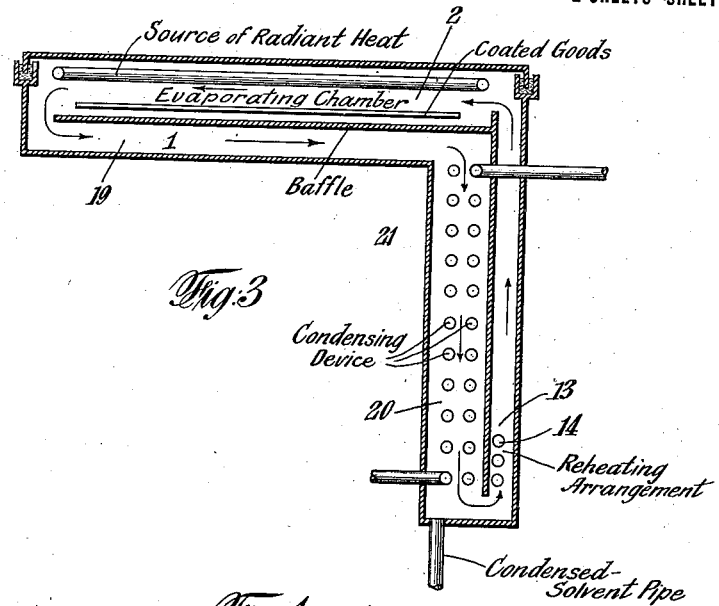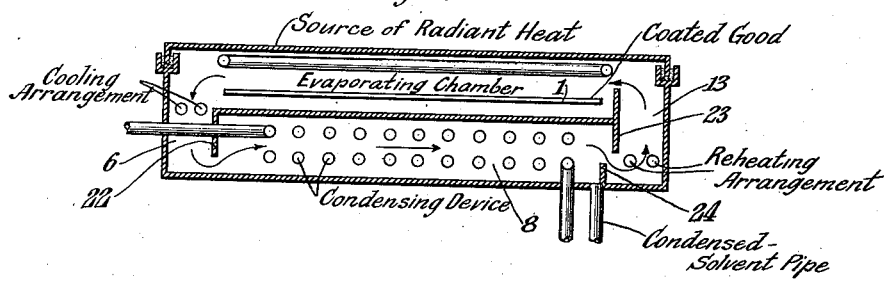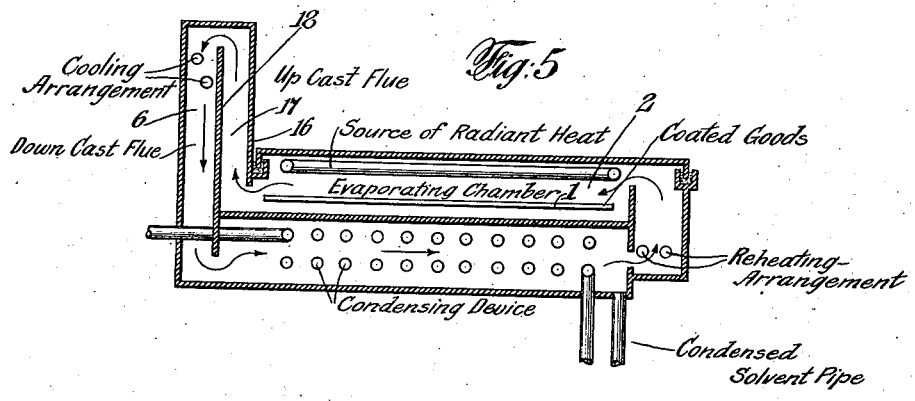

UNITED STATES PATENT OFFICE.

THEODORE BAKER, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

PROCESS OF RECOVERING SOLVENTS.

1,218,616.             Specification of Letters Patent.      Patented Mar. 13, 1917.

Original application filed October 7, 1912, Serial No. 724,309. Divided and this application filed March 26, 1915. Serial No. 17,167.

*To all whom it may concern:*

Be it known that I, THEODORE BAKER, of Wilmington, in the county of New Castle, and in the State of Delaware, have invented a certain new and useful Improvement in Processes for Recovering Solvents, and do hereby declare that the following is a full, clear, and exact description thereof.

My invention relates particularly to a method for recovering solvents used in coating compositions, although it may be adapted to use in any other connection where it is desired to recover solvents. My invention is particularly applicable to the recovery of solvents from coatings of paper or textile fabrics containing india rubber, pyroxylin, oils, paints or varnishes, and employing volatile solvents such as benzol, alcohol, ether, acetone or turpentine.

The object of my invention is to render the recovery of solvents more complete than has hitherto been possible; to render the danger of explosion as slight as possible, and to improve the quality of the product as well as the convenience and economy of operating the apparatus used for recovering the solvent.

My invention is carried out by passing the goods in a continuous coated web through an evaporating chamber where it is submitted to the action of a heated current of air. The air in the evaporating chamber having taken up the solvent evaporated is conducted to a condenser, where a portion of the solvent is condensed, the air with the residual solvent being again heated and returned to the evaporating chamber, while the condensed solvent, after purification, is employed in preparing fresh coating compositions. In carrying out my invention advantage is taken of the difference in densities of the vapors in the interior of the apparatus to effect the circulation thereof. The vapors within the interior of the evaporating chamber have different densities owing to different temperatures and the different quantities of solvent vapor carried by the circulating air. It is advantageous to provide a circulation which is effected without the use of special forcing means for the reason that great differences in local pressures are thereby avoided and there is not the great consequent tendency for leakage. Furthermore, in the type of circulation which I use, there is no mechanical apparatus to break down and thereby stop the circulation during the operation of the apparatus.

While my process is capable of being carried out in many different types of apparatus, I have shown only certain modifications of apparatus which I may use, in the accompanying drawings, in which—

Figure 1 is a vertical transverse section of one form of apparatus in which my process may be carried out, the parts being shown somewhat diagrammatically;

Fig. 2 is a similar view of another type of apparatus which I may use;

Fig. 3 is a similar view of still another type of apparatus;

Fig. 4 is a similar view of another type of apparatus used for the same purpose; and Fig. 5 is also a similar view of another type of apparatus used for the same purpose.

In the drawings, reference being had to Fig. 1, a traveling web 1 of paper or textile fabric, after being coated, is conveyed through an evaporating chamber 2 by any suitable means. While in the evaporating chamber 2, the web 1 passes beneath a series of heating coils 3 for evaporating the volatile liquids from the coating composition. The evaporating chamber is covered by an easily-removable cover 4, the edges of which are rendered air-tight by being retained in a liquid seal 5, filled with castor oil or other liquid, or in any other convenient manner as by fastening with adhesive tape. The current of air which is circulating through said chamber is led therefrom downwardly through a vertical passage 6 containing, at the upper end thereof, a series of cooling coils 7 to increase the specific gravity of the solvent-laden air, and to cool the same preliminary to the condensation and separation of the solvent therefrom. The cooled current of air carrying the solvent vapors is then conducted through a horizontally disposed condenser 8 over a series of cooling coils 9. The series of coils 9 is fed with a current of cold water or other refrigerating agent through an inlet 10 and discharges the same through an outlet 11. At the bottom of the condenser 8 there is a discharge pipe 12 for the condensed solvent. The air having had part of its contained solvent removed by condensation is reheated in any convenient manner as by passing over steam coils 14. The density being thereby reduced, it rises through a vertical passageway 13 and then returns to the evaporating chamber for re-use as before. A baffle 15 is provided to keep scrapings of coating material from falling down the flue 13 and to better direct the circulation of the air.

The type of apparatus shown in Fig. 2 is constructed in the same manner as that shown in Fig. 1, except that an elevated side chimney is employed to assist the draft, thus enabling the other parts to be built more compactly without sacrificing the efficiency of circulation, attained in the form shown in Fig. 1. In the form shown in Fig. 2, this difference in construction requires the solvent-laden air to be led downwardly past a baffle plate 16 to an upwardly directed chamber 17 over a baffle plate 18, and downwardly through the vertical passageway 6, over the cooling coils 7. The long passageway 6 materially assists in giving the circulating current of air the required speed.

The form of apparatus shown in Fig. 3 is the same as that shown in Fig. 1, except as follows:—After leaving the evaporating chamber 2, the solvent-laden air is conducted directly into a horizontal flue 19 located immediately below the evaporating chamber and from this point it is led directly to the vertically disposed condenser 20 having a set of cooling coils 21. The air which has been freed from the surplus solvent is thereafter led into contact with the reheating coils 14 located in the vertical passageway 13. This arrangement avoids the loss of any space in the middle of the apparatus between the several chambers.

Another and more compact form of apparatus is shown in Fig. 4 in which the construction is the same as in the case of the modification shown in Fig. 1, except that the condenser 8 is located immediately below the evaporating chamber 2, the vertical passageways 6 and 13 being made much wider to compensate for their shortness, and baffle plates 22 and 23 being located at the inlet and outlet ends of the condenser at the top thereof, and a baffle plate 24 being located at the bottom of the condenser at the outlet thereof to keep the condensed solvent away from the reheating arrangement.

In Fig. 5 I have shown a type of apparatus which is the same as that shown in Fig. 4, except that a passageway 17 and a passageway 6, together with baffle plates 16 and 18 are utilized which are similar to those shown in the form in Fig. 2. This type of apparatus gives a somewhat better circulation than that shown in Fig. 4, owing to the added length of the passageway 6.

The forms shown in Figs. 4 and 5 have the advantage that the condensed solvent is delivered at a high level, and that the space below the apparatus is entirely unencumbered.

The operation of my process is substantially the same in all of the different forms of apparatus, and is as follows: The coated web being constantly moved through the apparatus, the body of air contained therein is first heated by the reheating coils, thereby decreasing its density, and increasing its evaporating capacity. The heated current of air is then conducted over the coated surface which is at the same time subjected to the heat radiated from the heating coils located above the same. The heat lost by the coated web and the air in contact with it, due to the latent heat of evaporation is made good by radiation from the coil above in the upper part of the evaporating chamber, thus enabling a smaller volume of circulated air to effect the same amount of evaporation and a higher concentration of evaporated solvent to be reached, as well as more uniform and rapid drying, without risk of overheating. The current of air carrying a large percentage of evaporated solvent, is now cooled to the saturation point by contact with the cooling coils 7. The mixed air and solvent vapors thereupon acquire their greatest density, and fall at considerable speed downwardly through the vertical passageway 6 until the condenser is reached. The available part of the solvent is then condensed upon the surface of the cooling coils in the condenser, and is separated out and removed through the discharge pipe 12 located at the bottom thereof. A portion of the solvent having now been separated from the current of air, the latter is again conducted upwardly into contact with the heating coils 14, thereby decreasing the specific gravity of the same and causing it to again circulate in contact with the coating to be dried.

This application is a division of my application for process and apparatus for recovering solvent, Serial No. 724,309, filed October 7, 1912.

While I have shown and described above only certain forms of the process and apparatus which may be used for the carrying out of my invention, I wish it to be understood that many changes may be made therein without departing from the fundamental principles thereof.

I claim:—

1. The process which comprises effecting the evaporation of volatile solvent from a coating containing the same by a gaseous current circulated by convection, said gaseous current falling directly from the coating.

2. The process which comprises effecting the evaporation of volatile solvent from a coating containing the same by a gaseous current circulated by convection, induced by condensing the volatile solvent from the gaseous current, which falls directly from the coating.

3. The process which comprises effecting the evaporation of volatile solvent from a coating containing the same by a gaseous current circulated by convection, induced by lowering the temperature of a current thereof descending directly from the coating.

4. The process which comprises effecting the evaporation of volatile solvent from a coating containing the same by a gaseous current circulated by convection, induced by condensing the volatile solvent from the gaseous current, by lowering the temperature of a current descending directly from the coating, and raising the temperature of an ascending current thereof.

5. The process which comprises effecting the evaporation of volatile solvent from a coated fabric containing the same by a gaseous current circulated by convection, said gaseous current falling directly from the coating.

In testimony that I claim the foregoing I have hereunto set my hand.

THEODORE BAKER.

Witnesses:
P. E. STRICKLAND,
R. H. RAWLEIGH.